US012758032B2

(12) United States Patent
Li et al.

(10) Patent No.: US 12,758,032 B2
(45) Date of Patent: Oct. 13, 2026

(54) CONTROL BOX HAVING WIRELESS CHARGING AND SWITCH ACTUATION, AND ELECTRIC FURNITURE COMPRISING SAME

(71) Applicant: DEWERTOKIN TECHNOLOGY GROUP CO., LTD., Jiaxing (CN)

(72) Inventors: Long Li, Jiaxiang (CN); Zhenjie Zhu, Jiaxiang (CN); Congwei Xu, Jiaxiang (CN); Baowei Xu, Jiaxiang (CN)

(73) Assignee: DEWERTOKIN TECHNOLOGY GROUP CO., LTD., Jiaxing (CN)

( * ) Notice: Subject to any disclaimer, the term of this patent is extended or adjusted under 35 U.S.C. 154(b) by 705 days.

(21) Appl. No.: 18/268,702

(22) PCT Filed: Dec. 22, 2021

(86) PCT No.: PCT/CN2021/140264
§ 371 (c)(1),
(2) Date: Jun. 21, 2023

(87) PCT Pub. No.: WO2022/135428
PCT Pub. Date: Jun. 30, 2022

(65) Prior Publication Data

US 2024/0292960 A1 Sep. 5, 2024

(30) Foreign Application Priority Data

Dec. 23, 2020 (CN) ........................ 202023135005.5

(51) Int. Cl.
*A47C 31/00* (2006.01)
*H01H 13/04* (2006.01)
(Continued)

(52) U.S. Cl.
CPC ........... *A47C 31/008* (2013.01); *H01H 13/04* (2013.01); *H01H 13/365* (2013.01);
(Continued)

(58) Field of Classification Search
CPC ...................................................... H02J 50/10
(Continued)

(56) References Cited

U.S. PATENT DOCUMENTS

2010/0201201 A1* 8/2010 Mobarhan ................ H04B 5/79
320/108
2013/0057203 A1* 3/2013 Jones ........................ H02J 7/70
320/108
(Continued)

FOREIGN PATENT DOCUMENTS

CN 107518666 A 12/2017
CN 206992807 U 2/2018
(Continued)

OTHER PUBLICATIONS

Japanese Office Action for corresponding application 2023-533249; Report Dated Mar. 27, 2024.
(Continued)

*Primary Examiner* — Yalkew Fantu
(74) *Attorney, Agent, or Firm* — CANTOR COLBURN LLP

(57) ABSTRACT

Provided are a control box and electric furniture. In the control box, a wireless charging assembly is pressed downward by an external force such that the wireless charging assembly moves downward relative to the control box body to drive or push the pressing portion toward a control switch. When the pressing portion abuts against the control switch, the control switch acts. After the external force is removed, the wireless charging module moves away from the control switch under the action of an elastic resetting portion so that the pressing portion is separated from the control switch.

19 Claims, 7 Drawing Sheets

(51) Int. Cl.

| | |
|---|---|
| ***H01H 13/36*** | (2006.01) |
| ***H01H 13/52*** | (2006.01) |
| ***H02J 7/70*** | (2026.01) |
| ***H02J 7/80*** | (2026.01) |
| ***H02J 50/00*** | (2016.01) |
| ***H02J 50/10*** | (2016.01) |
| ***H04R 1/02*** | (2006.01) |
| ***H04R 1/08*** | (2006.01) |

(52) U.S. Cl.
CPC ............. *H01H 13/52* (2013.01); *H02J 7/731* (2026.01); *H02J 7/80* (2026.01); *H02J 50/005* (2020.01); *H02J 50/10* (2016.02); *H04R 1/025* (2013.01); *H04R 1/028* (2013.01); *H04R 1/083* (2013.01); *H01H 2217/004* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2014/0167688 | A1 * | 6/2014 | Doyle ...................... | H02J 7/44 320/108 |
| 2020/0113337 | A1 | 4/2020 | Liu et al. | |

FOREIGN PATENT DOCUMENTS

| | | | | | |
|---|---|---|---|---|---|
| CN | 207368757 U | | 5/2018 | | |
| CN | 209135656 U | | 7/2019 | | |
| CN | 209984560 U | | 1/2020 | | |
| CN | 211021793 U | | 7/2020 | | |
| CN | 111685483 A | * | 9/2020 | ........... | A63B 22/025 |
| CN | 213601063 U | | 7/2021 | | |
| IN | 212063568 U | | 12/2020 | | |
| JP | 2005267429 A | | 9/2005 | | |
| JP | 2011124030 A | | 6/2011 | | |
| JP | 2013247747 A | | 12/2013 | | |
| JP | 2015171533 A | | 10/2015 | | |

OTHER PUBLICATIONS

Japanese Notice of Allowance; Application No. 2023533249 ; Date of mailing: Apr. 15, 2025; 5 pages.

International Search Report for corresponding application PCT/CN2021/140264 filed Dec. 22, 2021; Mail date: Mar. 22, 2022.

* cited by examiner

CONTROL BOX HAVING WIRELESS CHARGING AND SWITCH ACTUATION, AND ELECTRIC FURNITURE COMPRISING SAME

CROSS-REFERENCE TO RELATED APPLICATION

This is a National stage application, filed under 37 U.S.C. 371, of International Patent Application NO. PCT/CN2021/140264, filed on Dec. 22, 2021, which is based on and priority to Chinese Patent Application No. 202023135005.5 filed with the China National Intellectual Property Administration (CNIPA) on Dec. 23, 2020, the disclosure of which is incorporated herein by reference in its entirety.

TECHNICAL FIELD

The present disclosure relates to the field of intelligent control technology, for example, a control box and electric furniture.

BACKGROUND

Electric furniture such as electric sofas, electric beds, and electric tables and chairs normally perform functions such as lifting, massage, and folding through a control box on the furniture. Electric furniture is widely used because of comfortableness and diverse functions compared with traditional furniture.

For a control box to have diverse functions, the control box is typically provided with a wireless charging function so that a user can charge a mobile device such as a mobile phone when using the electric furniture.

Although some control boxes also have a wireless charging function, a structure for implementing the wireless charging function and a button for controlling the operation of the electric furniture are separate from each other in one case, so the volume of the whole control box is large, and the aesthetic effect is poor.

SUMMARY

The embodiments of the present disclosure provide a control box. The control box includes a control box body, a control board, and a control switch electrically connected to the control board. The control box also includes a wireless charging assembly electrically connected to the control board. The wireless charging assembly and the control box body are connected to each other to form an accommodation space for accommodating the control board. The accommodation space contains a control switch, a pressing portion, and an elastic resetting portion.

The control switch is electrically connected to the control board and configured to control the operation of an electric component.

The wireless charging assembly is liftable relative to the control box body and is configured to drive the pressing portion to act to abut against the control switch.

The elastic resetting portion is configured to provide the force for raising the wireless charging assembly so that the pressing portion is separated from the control switch.

The embodiments of the present disclosure also disclose electric furniture including the preceding control box.

BRIEF DESCRIPTION OF DRAWINGS

The drawings used in description of embodiments of the present disclosure are briefly described hereinafter. The drawings described hereinafter illustrate some embodiments of the present disclosure. Those of ordinary skill in the art may obtain other drawings based on the content of the embodiments of the present disclosure and these drawings on the premise that no creative work is done.

REFERENCE LIST

Figure 1:
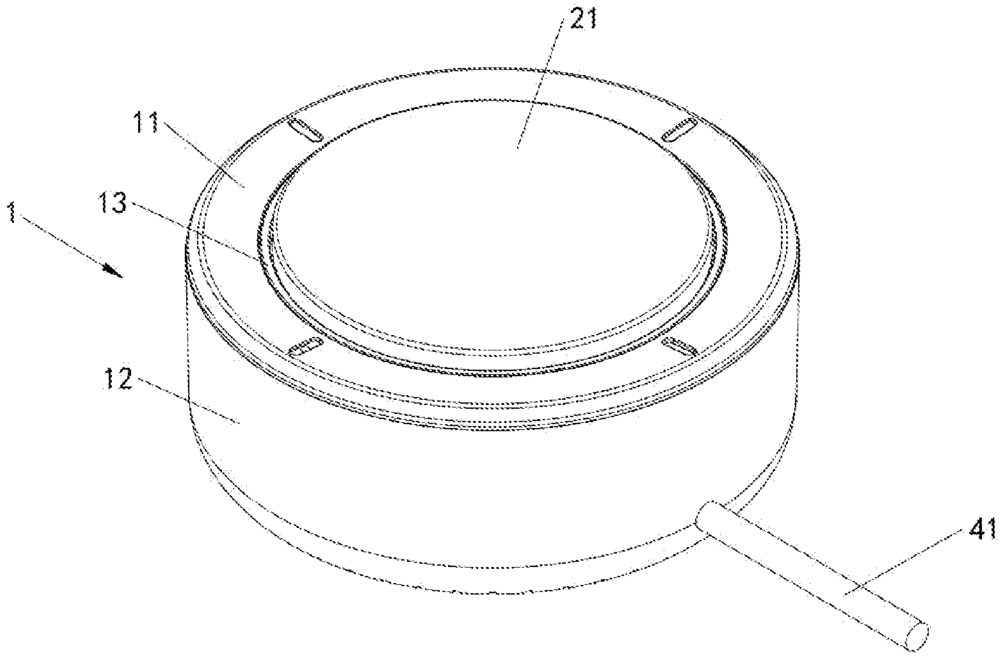
FIG. 1 is structure view one of a control box according to an embodiment of the present disclosure.

1 control box body
11 upper cover
111 light-transmissive hole
112 first mounting slot
113 second mounting slot
114 microphone sound hole
115 first limit boss
1151 first limit groove
1152 second limit groove
116 second limit boss
117 limit slot
12 lower cover
1201 threading hole
1202 support arm
1203 support surface
121 protrusion
122 anti-slip pad
123 second positioning column
1231 support table
124 annular slot
125 plughole
126 mounting board
127 loudspeaker sound hole
128 connection column
129 fixing member
13 mounting portion
131 wire slot
132 annular flange
133 fastener hole
134 mounting boss
1341 limit fastener
1342 positioning groove
135 limit surface

1351 limit protrusion
136 first positioning column
137 positioning rib
14 elastic resetting portion
141 elastic arm
142 support plate
1421 limit table
2 wireless charging assembly
21 charging cover
211 mounting table
212 slot
213 flange
214 anti-drop fastener
22 wireless charging coil
31 pressing portion
32 control switch
4 control board
41 control cable
42 voice indicator light
43 first limit insertion slot
44 second limit insertion slot
45 notch
46 positioning hole
51 microphone
52 speaker
53 light guide cover
6 charging assembly
61 charging board
62 charging terminal
7 external screw
8 wire pressing board

DETAILED DESCRIPTION

The technical solutions of the present disclosure are described hereinafter in conjunction with drawings and embodiments. It is to be understood that the embodiments described herein are intended to illustrate and not to limit the present disclosure. It should also be noted that, for ease of description, only part, not all, of the present disclosure is shown in drawings.

Embodiment One

Figure 2:
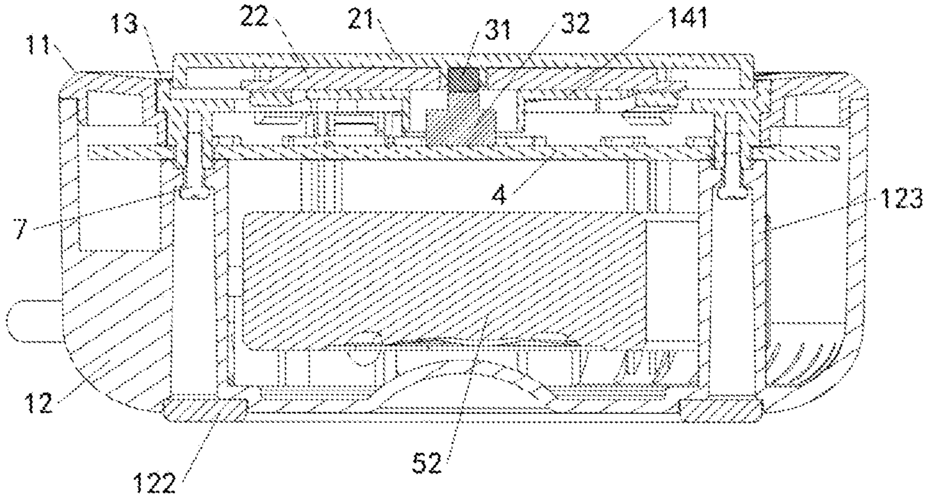
FIG. 2 is sectional view one of a control box according to an embodiment of the present disclosure.
Figure 3:
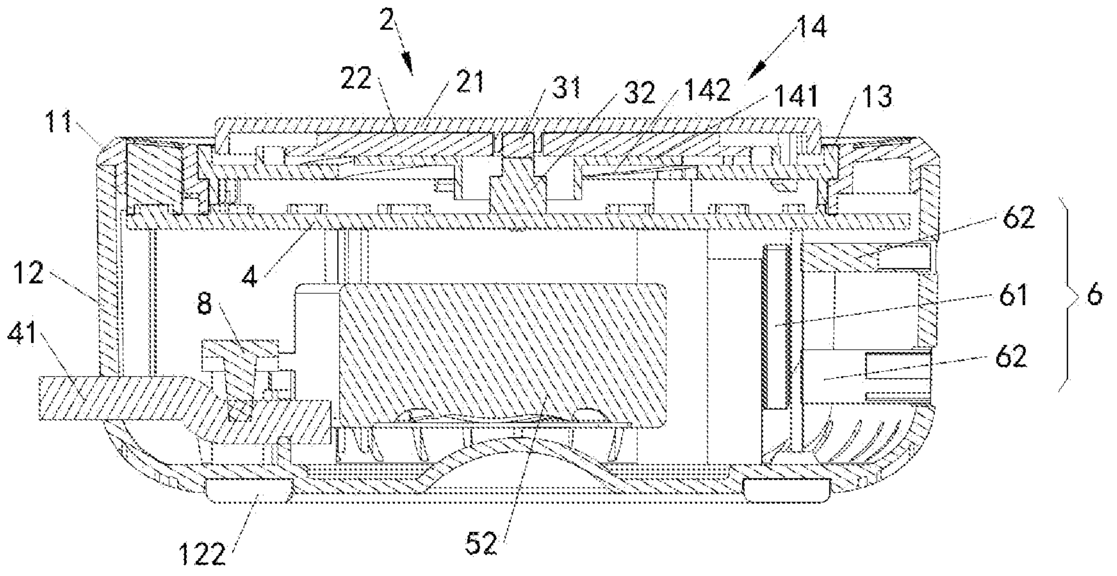
FIG. 3 is sectional view two of a control box according to an embodiment of the present disclosure.

As shown in FIGS. 1 to 3, the present embodiment provides a control box. The control box includes a control box body 1, a control board 4, a control switch 32, a pressing portion 31, a wireless charging assembly 2, and an elastic resetting portion 14. The wireless charging assembly 2 and the control switch 32 are both electrically connected to the control board 4. The wireless charging assembly 2 and the control box body 1 are connected to each other to form an accommodation space. The control board 4, the pressing portion 31, the control switch 32, and the elastic resetting portion 14 are all disposed in the accommodation space. The wireless charging assembly 2 is liftable relative to the control box body 1. The wireless charging assembly 2 is configured to drive the pressing portion 31 to act to abut against the control switch 32. The elastic resetting portion 14 is configured to provide a force for raising the wireless charging assembly 2 so that the pressing portion 31 is separated from the control switch 32.

The wireless charging assembly 2 is pressed downward by an external force such that the wireless charging assembly 2 moves downward relative to the control box body 1 to drive or push the pressing portion 31 toward the control switch 32. When the pressing portion 31 abuts against the control switch 32, the control switch 32 acts. After the external force is removed, the wireless charging module 2 is raised by the elastic resetting portion 14 so that the pressing portion 31 is separated from the control switch 32.

In the control box according to the present embodiment, the wireless charging assembly 2, the pressing portion 31, and the control switch 32 are arranged in cooperation so that the compactness among structural members of the control box is improved, the integration degree of the control box is improved, the volume of the control box is reduced, and the appearance effect of the control box is improved.

In the present embodiment, the elastic resetting portion 14 includes a support plate 142 disposed directly below the wireless charging assembly 2 and abutting against the wireless charging assembly 2, and elastic arms 141 capable of elastically deforming. The support plate 142 is connected to the control box body 1 by multiple elastic arms 141 distributed in a peripheral direction. In other embodiments, the elastic resetting portion 14 may be replaced by a spring. For example, the lower end of the spring is connected to the control box body 1, and the upper end of the spring abuts against the lower surface of the wireless charging assembly 2.

Figure 4:
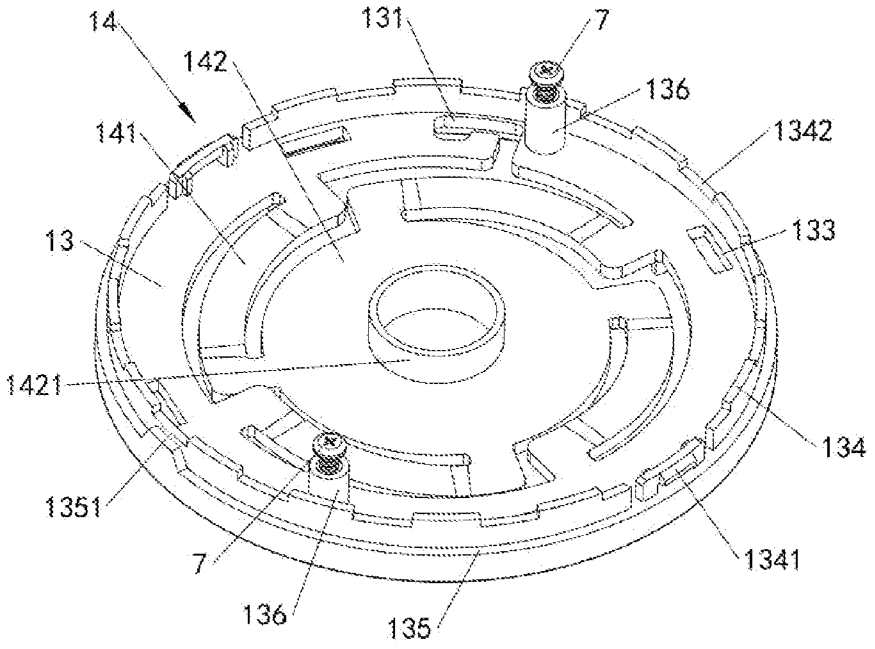
FIG. 4 is view one of the connection between a mounting portion, a support plate, and an elastic arm according to an embodiment of the present disclosure.
Figure 5:
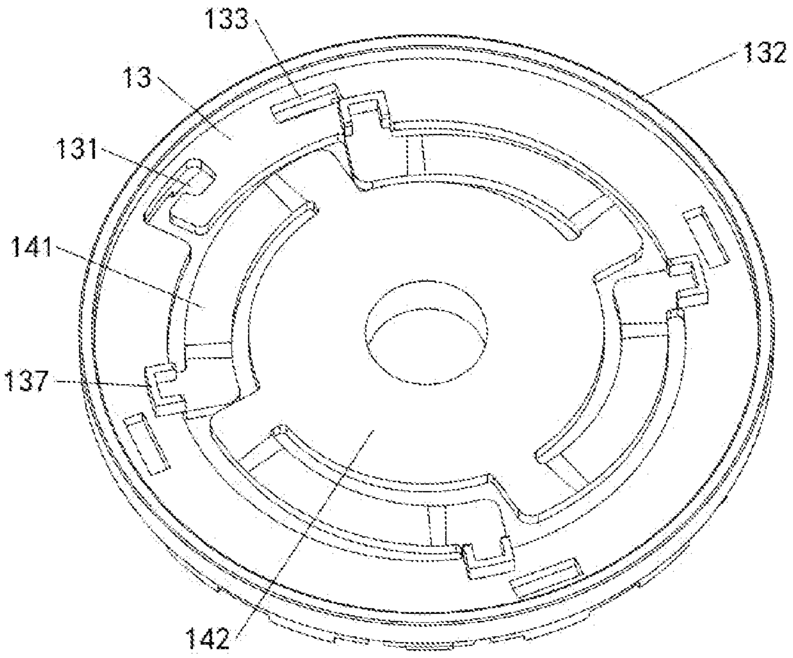
FIG. 5 is view two of the connection between a mounting portion, a support plate, and an elastic arm according to an embodiment of the present disclosure.

In an embodiment, the control box body 1 includes an upper cover 11, a lower cover 12, and a mounting portion 13. The lower cover 12 is a top-open structure. The upper cover 11 is connected to the lower cover 12. As shown in FIGS. 4 and 5, the mounting portion 13 is an annular structure. The mounting portion 13 is connected to the upper cover 11. The support plate 142 is connected to the mounting portion 13 by multiple elastic arms 141 distributed in a peripheral direction. In the present embodiment, four elastic arms 141 are provided. The four elastic arms 141 are distributed at equal intervals along a peripheral direction of the support plate 142.

In an embodiment, the elastic arm 141, the support plate 142, and the mounting portion 13 are integrally formed. For example, the elastic arm 141 is an arc board. One end of each arc board is connected to the outer peripheral wall of the support plate 142, and the other end of the each arc board is connected to the inner peripheral wall of the mounting portion 13. The outer peripheral wall of the support plate 142 is spaced out from the inner peripheral wall of the arc board, and the outer peripheral wall of the arc board is spaced out from the inner peripheral wall of the mounting portion 13 so that the support mounting board 142 can move downward under pressure, and the elastic arm 141 is stretched downward.

When the wireless charging assembly 2 is pressed downward, the pressing portion 31 moves downward to approach the control switch 32. At the same time, the wireless charging assembly 2 presses the support plate 142 and forces the support plate 142 to move downward. The elastic arm 141 is stretched downward relative to the mounting portion 13 under the pressing action of the support plate 142. After the external force is removed, the elastic arm 141 is reset to pull the support plate 142 upward, and the support plate 142 pushes the wireless charging assembly 2 upward so that the pressing portion 31 separated from the control switch 32.

As shown in FIGS. 1 to 3 and FIGS. 5 to 7, in the present embodiment, the wireless charging assembly 2 includes a wireless charging coil 22 and a charging cover 21. Multiple positioning ribs 137 protrude from the upper surface of the mounting portion 13 along a peripheral direction so that the wireless charging coil 22 is engaged in the space surrounded by the positioning ribs 137.

In other embodiments, multiple positioning ribs are disposed on the lower surface of the charging cover 21 along the peripheral direction of the charging cover 21, and the wireless charging coil 22 is engaged in the space surrounded by the positioning ribs.

In an embodiment, one end of the pressing portion 31 is connected to the wireless charging assembly 2, and the other end of the pressing portion 31 passes through the support plate 142 and faces the control switch 32. For example, the upper end of the pressing portion 31 is connected to the lower surface of the charging cover 21. Both the middle of the wireless charging coil 22 and the middle of the support plate 142 are provided with a through hole. The lower end of the pressing portion 31 passes through the wireless charging coil 22 and the support plate 142 in sequence and faces the control switch 32. In an embodiment, a mounting table 211 protrudes from the lower surface of the charging cover 21. The wireless charging coil 22 is sleeved on the mounting table 211. The pressing portion 31 is disposed at the center of the charging cover 21 and is connected to the mounting table 211 by plugging. The connection is simple and convenient for detachment. In other embodiments, the pressing portion 31 may also be in threaded connection to the charging cover 21.

In an embodiment, as shown in FIGS. 1 to 9, the wireless charging assembly 2 is engaged to the control box body 1. For example, the wireless charging assembly 2 is provided with multiple anti-drop fasteners 214 distributed in a peripheral direction. The mounting portion 13 is provided with fastener holes 133 in one-to-one correspondence with the anti-drop fasteners 214.

The anti-drop fasteners 214 are configured to pass through the corresponding fastener hole 133 and can abut against the lower surface of the mounting portion 13 or be separated from the lower surface of the mounting portion 13 selectively.

In an embodiment, the anti-drop fasteners 214 are disposed on the lower surface of the charging cover 21. The wireless charging coil 22 is disposed in the annular space surrounded by the anti-drop fasteners 214. The lower surface of the charging cover 21 is provided with a slot 212 to form a flange 213. An anti-drop fastener 214 includes a fastener body and an anti-drop portion. The upper end of the fastener body is connected to the bottom wall of the slot 212. The lower end of the fastener body protrudes out of the slot 212. The anti-drop portion protrudes outside from the side surface of the lower end of the fastener body facing the central axis of the charging cover 21.

When no external force is applied to the wireless charging assembly 2, the upper surface of the support plate 142 abut against the lower surface of the wireless charging coil 22 to sandwich the wireless charging coil 22 between the lower surface of the charging cover 21 and the upper surface of the support plate 142. The charging cover 21 is subjected to an upward force applied by the support plate 142 so that the anti-drop portion abuts against the lower surface of the mounting portion 13. At this time, the lower surface of the flange 213 is spaced out from the upper surface of the mounting portion 13. When the wireless charging assembly 2 is pressed downward, the support plate 142 moves downward. The mounting portion 13 is limited by the upper cover 11 and cannot be actuated. The anti-drop portion is separated from the lower surface of the mounting portion 13 and move downward so that the interval between the lower surface of the flange 213 and the upper surface of the mounting portion 13 is gradually reduced. When the lower surface of the flange 213 abuts against the upper surface of the mounting portion 13, the pressing portion 31 abuts against the control switch 32, and the charging cover 21 is prevented from moving downward to prevent the pressing portion 31 from damaging the control switch 32 due to excessive force applied to the control switch 32. In an embodiment, a stop table 1421 protrudes outside on the lower surface of the support plate 141. When the pressing portion 31 abuts against the control switch 32, the stop table 1421 abuts against the upper surface of the control board 4 to further prevent the pressing portion 31 from damaging the control switch 32 due to excessive force applied to the control switch 32.

In an embodiment, the control box also includes a light guide cover 53 made of a light-transmissive material and exposed to the outside environment and a wireless charging indicator light disposed toward the light guide cover 53 and electrically connected to the control board 4. The wireless charging indicator light is configured to indicate whether the wireless charging assembly 2 is at work. In the present embodiment, the lower end of the wireless charging indicator light is connected to the control board 4, and a light guide cover 53 is disposed on the upper end of the wireless charging indicator light. The upper cover 11 is provided with a light-transmissive hole 111. The upper end of the light guide cover 53 blocks the light-transmissive hole 111.

For example, the lower surface of the upper cover 11 is further provided with a first mounting slot 112 opposite to the light guide cover 53. The light-transmissive hole 111 is configured to penetrate through the bottom wall of the first mounting slot 112 along a vertical direction. The upper end of the light guide cover 53 is inserted in the first mounting slot 112 to block the light-transmissive hole 111. In this manner, it is possible to see from the outside through the light-transmissive hole 111 whether or not the wireless charging indicator light is lighted. Moreover, the outside dust is prevented from entering the control box body 1 through the light-transmissive hole 111.

In the present embodiment, the wireless charging coil 22 is connected to the control board 4 through a wire. A wire slot 131 is disposed on the mounting portion 13. Two wires connected to the wireless charging coil 22 pass through the wire slot 131 and are electrically connected to the control board 4.

In an embodiment, the control box also includes a microphone 51 electrically connected to the control board 4. The microphone 51 is disposed in the control box body 1 so that the control box has a voice control function. In the present embodiment, the microphone 51 is disposed above the control board 4. A microphone sound hole 114 is disposed on the upper cover 11 opposite to the microphone 51, thereby improving the sound reception function of the microphone 51.

For example, the lower surface of the upper cover 11 is provided with a second mounting slot 113 opposite to the microphone 51. The upper end of the microphone 51 is inserted in the second mounting slot 113. The microphone sound hole 114 is configured to penetrate through the bottom wall of the second mounting slot 113 along a vertical direction.

In an embodiment, the control box also includes a voice indicator light 42 disposed in the accommodation space and electrically connected to the control board 4. The voice indicator light 42 is configured to indicate the working state of the microphone 51. The mounting portion 13 is at least partially made of a light-transmissive material. The voice indicator light 42 is arranged toward the mounting portion 13 made of a light-transmissive material. In an embodiment, the entire mounting portion 13 is made of a light-transmissive material. The working state of the microphone 51 can be judged by observing whether the voice indicator light 42 below the mounting portion 13 is lighted or what color the lighted voice indicator light 42 is. In the present embodiment, if the voice indicator light 42 is off, the microphone 51 is not turned on. If the voice indicator light 42 is blue, the microphone 51 is working. If the voice indicator light 42 is red, the microphone 51 is forbidden from working.

Figure 6:
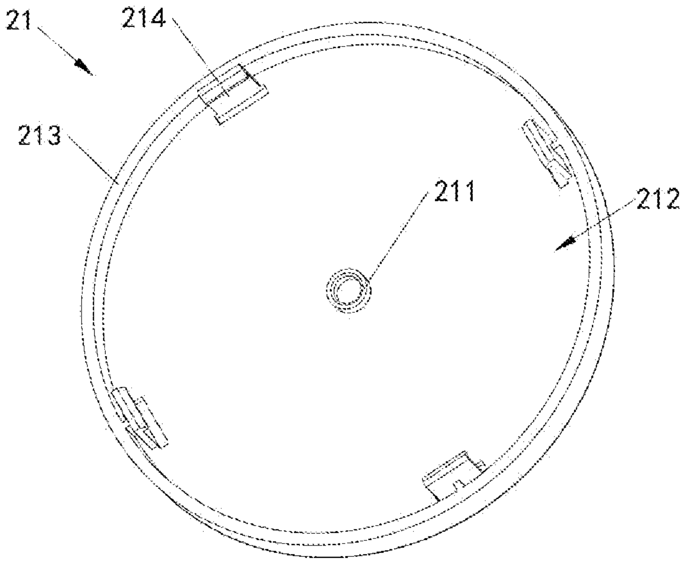
FIG. 6 is a view of a charging cover according to an embodiment of the present disclosure.
Figure 7:
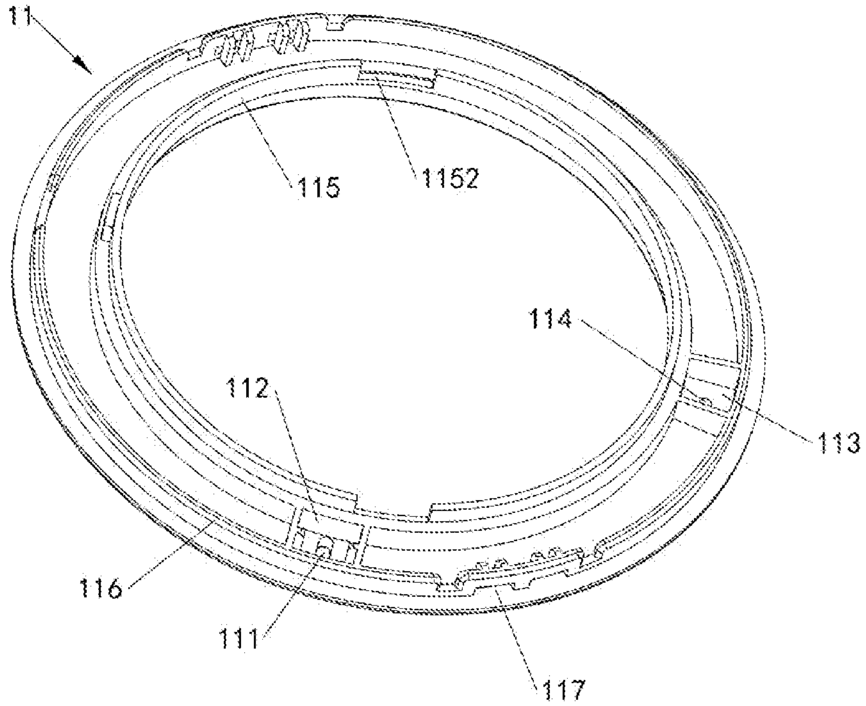
FIG. 7 is view one of an upper cover according to an embodiment of the present disclosure.
Figure 8:
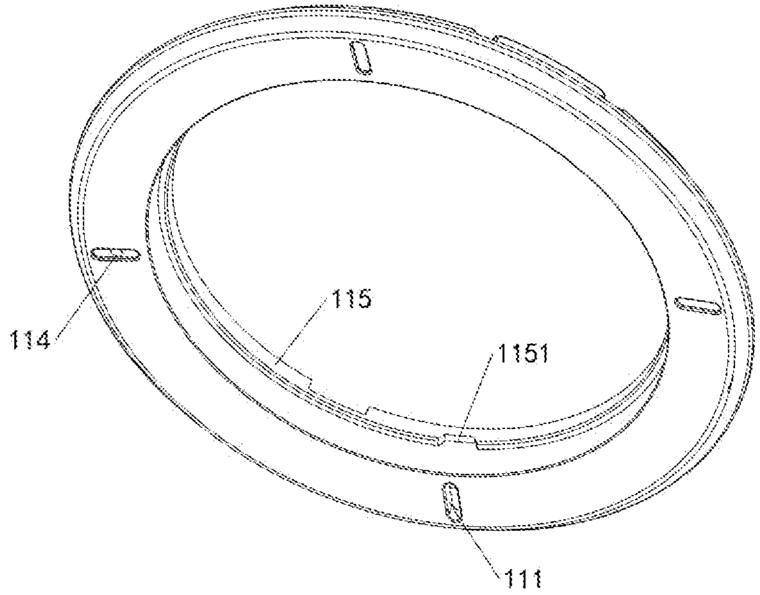
FIG. 8 is view two of an upper cover according to an embodiment of the present disclosure.
Figure 9:
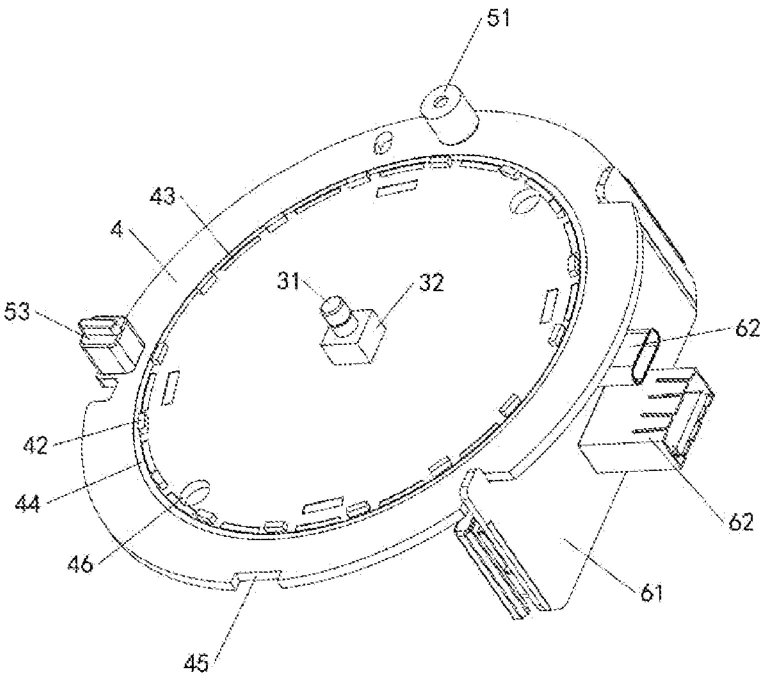
FIG. 9 is a view of a control board according to an embodiment of the present disclosure.
Figure 10:
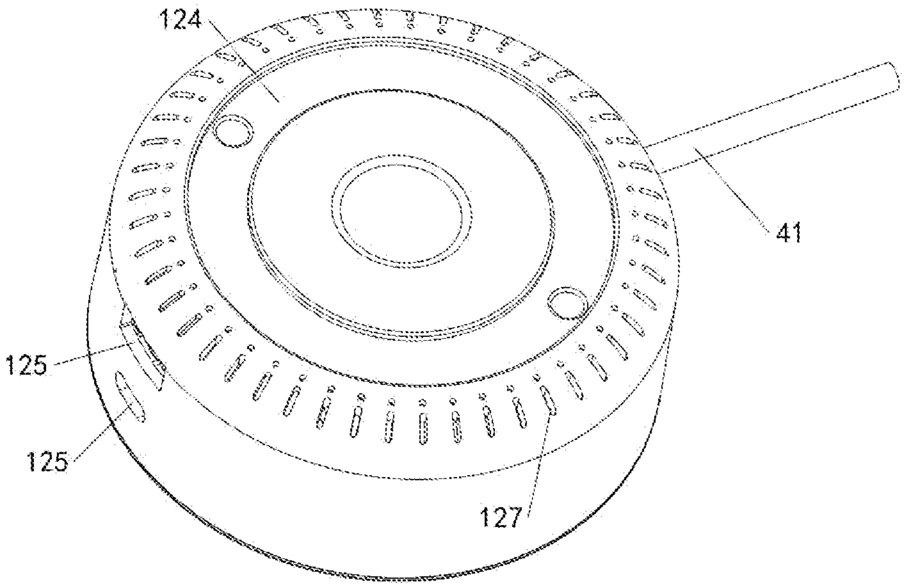
FIG. 10 is view two of a control box according to an embodiment of the present disclosure.
Figure 11:
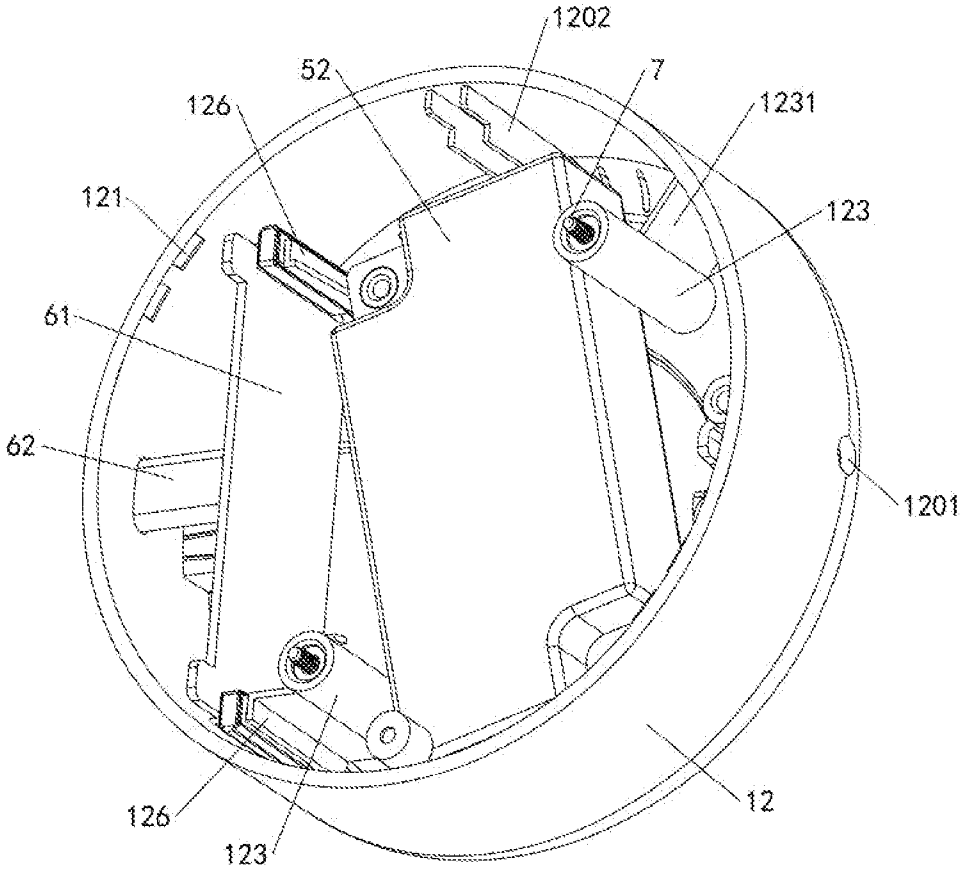
FIG. 11 is partial view one of a control box according to an embodiment of the present disclosure.
Figure 12:
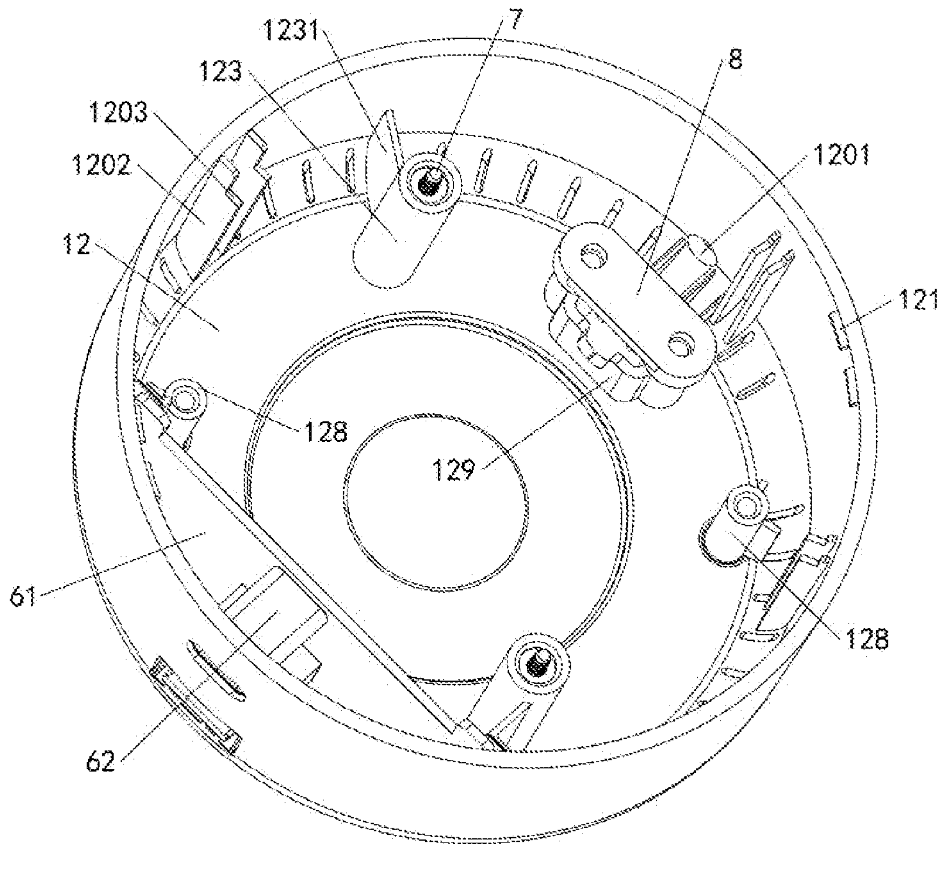
FIG. 12 is partial view two of a control box according to an embodiment of the present disclosure.

In an embodiment, as shown in FIGS. 4, 5, and 6, the upper surface of the mounting portion 13 is provided with a mounting slot to form an annular flange 132. The fastener hole 133 is configured to penetrate through the bottom wall of the mounting slot, and the flange 213 is inserted in the mounting slot so that the annular flange 132 is exposed and is not shielded by the charging cover 21. In this manner, whether the voice indicator light 42 is lighted and what color the lighted voice indicator light 42 is can be observed through the mounting portion 13.

In an embodiment, to improve the appearance effect of the control box, the lower surface of the flange 213 is not higher than the upper surface of the annular flange 132. In this manner, whether the wireless charging assembly 2 is pressed or not, the flange 213 is not higher than the annular flange 132, and the interval between the lower surface of the flange 213 and the upper surface of the mounting portion 13 is not observed from the outside of the control box, thereby improving the aesthetic effect of the control box.

In an embodiment, the upper cover 11 is engaged to the mounting portion 13. For example, the lower surface of the mounting portion 13 is provided with a mounting boss 134. The portion by which the outer ring of the mounting boss 134 is smaller than the outer wall of the mounting portion 13 constitutes a limit surface 135. In the present embodiment, the mounting boss 134 is an annular structure. The limit surface 135 is formed between the outer peripheral wall of the mounting boss 134 and the outer peripheral wall of the mounting portion 13.

A limit fastener 1341 protrudes from the outer peripheral wall of the mounting boss 134. The upper cover 11 is an annular structure, and the inner peripheral wall of the upper cover 11 is provided with a first limit boss 115. The lower end of the mounting portion 13 is inserted in the upper cover 1 from top so that the limit fastener 1341 is squeezed by the inner peripheral wall of the upper cover 11, and when the limit surface 135 abuts against the upper surface of the first limit boss 115, the mounting portion 13 cannot move further. At this time, the limit fastener 1341 is configured to pass through the upper cover 11 and abut against the lower surface of the first limit boss 115, and the first limit boss 115 is sandwiched between the limit surface 135 and the limit fastener 1341, thereby realizing the fastening between the upper cover 11 and the mounting portion 13. Due to the preceding connection method, the upper cover 11 does not shield the annular flange 132, thereby ensuring that the entire annular flange 132 is exposed and facilitating the observation of the lighting of the voice indicator light 42. In the present embodiment, the first limit boss 115 is an annular structure to increase the contact area between the limit surface 135 and the first limit boss 115, thereby improving the stability of the fastening between the upper cover 11 and the mounting portion 13.

To prevent the mounting portion 13 from rotating relative to the upper cover 11, the limit surface 135 is provided with limit protrusions 1351. The upper surface of the first limit boss 115 is provided with first limit grooves 1151 in one-to-one correspondence with the limit protrusions 1351. A limit protrusion 1351 and a first limit groove 1151 are inserted along a vertical direction to limit the rotation of the mounting portion 13 relative to the upper cover 11. In an embodiment, the lower end of the first limit boss 115 is configured to extend out the mounting portion 13 by a distance. The lower surface of the first limit boss 115 is provided with a second limit groove 1152. When the first limit boss 115 is sandwiched between the limit surface 135 and the limit fastener 1341, the limit fastener 1341 abuts against the bottom wall of the second limit groove 1152.

To improve the appearance effect of the control box, in the present embodiment, the upper surface of the upper cover 11 is flush with the upper surface of the annular flange 132.

In an embodiment, a positioning groove 1342 is disposed on the lower surface of the mounting boss 134. To prevent the control board 4 from shaking, in the present embodiment, a first limit insertion slot 43 is disposed on the upper surface of the control board 4. The mounting boss 134 is inserted in the first limit insertion slot 43 and abuts against the bottom wall of the first limit insertion slot 43.

In the present embodiment, the control board 4 is provided with a notch 45. A support arm 1202 protrudes from the inner wall of the lower cover 12. One end of the support arm 1202 passes through the notch 45. A support surface 1203 is formed on the support arm 1202 so that the control board 4 is supported by the support surface 1203.

In the present embodiment, the upper surface of the control board 4 is provided with a second limit insertion slot 44. The first limit boss 115 on the upper cover 11 is inserted in the second limit insertion slot 44 and abuts against the bottom wall of the second limit insertion slot 44 to improve the stability of the connection between the control board 4, the upper cover 11 and the mounting portion 13.

In an embodiment, the upper cover 11 is engaged to the lower cover 12. For example, the inner wall of the lower cover 12 is provided with protrusions 121. The lower surface of the upper cover 11 is provided with a second limit boss 116. The outer wall of the second limit boss 116 is provided with limit slots 117 in one-to-one correspondence with the protrusions 121. The second limit boss 116 is inserted in the lower cover 12 so that the protrusions 121 are inserted in the corresponding limit slots 117. In the preceding manner, the upper cover 11 is engaged to the lower cover 12. Moreover, neither the protrusions 121 nor the second limit boss 116 is exposed, thereby improving the appearance effect of the control box.

In the present embodiment, the second limit boss 116 is an annular structure. To improve the structural strength of the second limit boss 116 where the limit slot 117 is disposed, multiple reinforcing ribs are disposed on the inner wall of the second limit boss 116. The reinforcing ribs are disposed opposite to the limit slot 117. The reinforcing ribs are configured to connect the lower surface of the upper cover 11 with the inner peripheral wall of the second limit boss 116.

In an embodiment, the protrusions 121 and the second limit boss 116 can be exchanged in terms of position. For example, the second limit boss 116 is disposed on the outer peripheral wall of the lower cover 12. The upper cover 11 is a structure opened downwards. The protrusions 121 are disposed on the inner wall of the upper cover 11. The upper end of the lower cover 12 is inserted in the upper cover 11. The protrusions 121 are inserted in the corresponding limit slots 117 on the second limit boss 116.

In an embodiment, as shown in FIGS. 1 to 12, the lower surface of the mounting portion 13 is provided with first positioning columns 136. The control board 4 is provided with positioning holes 46 in one-to-one correspondence with the first positioning columns 136. Second positioning columns 123 in one-to-one correspondence with the first positioning columns 136 are configured to protrude on the inner bottom wall of the lower cover 12. The second positioning column 123 is provided with a mounting hole. The inner wall of the mounting hole is provided with a step. The two end surfaces of the step form a first step surface and a second step surface. The lower end of the first positioning column 136 is configured to pass through the corresponding positioning hole 46 and the step hole on the corresponding second positioning column 12 in sequence and then abut against the first step surface. One end of an external screw 7 passes through the step hole on the second positioning column 123 and is in threaded connection to the first positioning column 136. The head of the external screw 7 abuts against the second step surface so that the mounting portion 13 is connected to the lower cover 12. In the present embodiment, two first positioning columns 136 are provided. The two first positioning columns 136 are disposed on the lower surface of the mounting portion 13 at 180 degrees.

In an embodiment, the outer bottom wall of the lower cover 12 is provided with an anti-slip pad 122. In this manner, the control box has an anti-slip function by the anti-slip pad 122. For example, the anti-slip pad 122 is a silica gel mat.

For example, the outer bottom wall of the lower cover 12 is provided with an annular slot 124. The second positioning column 123 is disposed opposite to the annular slot 124 so that the head of the external screw 7 is disposed in the annular slot 124. The annular slot 124 is provided with an anti-slip pad 122 to shield the head of the external screw 7. The lower surface of the anti-slip pad 122 is not lower than the outer bottom wall of the lower cover 12. With the preceding arrangement, the anti-slip pad 122 not only has anti-slip function and anti-wear function but also avoids the exposure of the head of the external screw 7 so that the aesthetic effect of the entire controller is not harmed.

In an embodiment, the control box also includes a charging assembly 6 disposed in the accommodation space and electrically connected to the control board 4. The control box body 1 is provided with a plughole 125. The charging terminal 62 of the charging assembly 6 is inserted in the plughole 125. With the preceding arrangement, the control box not only has function of wirelessly charging a mobile terminal such as a mobile phone but also can be connected to the mobile terminal through the charging assembly 6 to realize wired charging. In an embodiment, the charging assembly 6 includes two types of charging terminal 62 to meet the charging requirements of different mobile terminals. One type of charging terminal 62 adopts Type-A interface, and the other type of charging terminal 62 adopts Type-C interface.

For example, the plughole 125 is disposed on the lower cover 12. A mounting board 126 protrudes from the inner wall of the lower cover 12. The mounting board 126 is provided with a first insertion slot extending along a vertical direction. The charging board 61 of the charging assembly 6 is inserted in the first insertion slot and is supported by the bottom wall of the first insertion slot. In an embodiment, two mounting boards 126 are provided. The two mounting boards 126 are spaced apart.

In an embodiment, a loudspeaker 52 electrically connected to the control board 4 is disposed in the control box body 1. With the loudspeaker 52, the control box not only has a voice control function but also a voice broadcasting function. In case the control box body 1 insulates sound, in the present embodiment, multiple loudspeaker sound holes 127 are disposed in the lower portion of the lower cover 12.

For example, the loudspeaker 52 is disposed between the inner bottom wall of the lower cover 12 and the control board 4. A connection column 128 protrudes from the inner bottom wall of the lower cover 12. The outer wall of the connection column 128 is provided with a support table 1231. The connection column 128 passes through the loudspeaker 52, and the loudspeaker 52 is supported by the support table 1231. The connection column 128 is in threaded connection to a first screw: The loudspeaker 52 is sandwiched between the head of the first screw and the support table 1231.

In an embodiment, the control box also includes a control cable 41. One end of the control cable 41 is connected to the control board 4, and the other end of the control cable 41 is configured to extend out of the control box body 1. For example, the sidewall of the lower cover 12 is provided with a threading hole 1201 for threading the control cable 41.

To prevent that the control cable 41 shakes and causes the connection between the control cable 41 and the control board 4 to loosen, in the present embodiment, a fixing member 129 is provided on the inner bottom wall of the lower cover 12. A wire pressing slot is disposed on the fixing member 129. A wire pressing board 8 is connected to the upper part of the fixing member 129 to sandwich the control cable 41 between the fixing member 129 and the wire pressing board 8. For example, the preceding fixing member 129 and the wire pressing board 8 are connected through a second screw:

In an embodiment, the mounting portion 13 and the lower cover 12 are connected by a fastening piece.

For example, the fastener may be a self-tapping screw.

The present embodiment also provides electric furniture including the preceding control box so that it is convenient for a user to control the electric furniture through the control box. Moreover, the control box has wireless charging function so that the user can wirelessly charge a mobile terminal such as a mobile phone by the control box. In the control box, the wireless charging assembly 2, the control switch 32, and the pressing portion 31 are arranged in cooperation. In this manner, the compactness among structural members in the control box is improved, the volume of the control box is reduced, the appearance effect of the control box is improved, and the user has high satisfaction.

Embodiment Two

The difference between the present embodiment and embodiment one is that the mounting portion 13 is located differently. For example, the upper end of a pressing portion 31 is connected to the lower surface of a support plate 142. The lower end of the pressing portion 31 is configured to face a control switch 32. When a wireless charging assembly 2 is pressed downward, the wireless charging assembly 2 moves downward relative to a mounting portion 13 so that an anti-drop fastener 214 is separated from the lower surface of the mounting portion 13. At the same time, the support plate 142 drives the pressing portion 31 to move downward. In this manner, the pressing portion 31 abuts against the control switch 32. At the same time, an elastic arm 141 is stretched downward under the action of the support plate 142. After the external force is removed, the support plate 142 moves the pressing portion 31 upward under the action of the elastic arm 141 so that the pressing portion 31 is separated from the control switch 32. At the same time, the support plate 142 is driven to drive the wireless charging assembly 2 to move upward relative to the mounting portion 13 so that the anti-drop fastener 214 abuts against the lower surface of the mounting portion 13.

In an embodiment, the control switch 32 may control a motor to operate or may act as a voice switch. For example, the control switch 32 may control a motor to operate or may act as a voice switch by transmitting a control signal.

In an embodiment, the control switch 32 is primarily used to control the enabling and disabling of the voice function.

In an embodiment, the electric component controlled by the control switch 32 may be a driving motor such as a driver or may be a control box for controlling the driving of a motor. For example, the control switch 32 sends a control signal to the motor of an electric bed to control the operation of the electric bed.

In an example in which the electric component controlled by the control switch 32 is a control box for controlling the driving of the motor, generally, a remote controller may be used to control the control box associated with the electric bed to trigger the motor movement of the electric bed. With the present embodiment, the control box according to the present embodiment can be used to remotely control the control box associated with the electric bed to trigger the motor movement of the electric bed. It can be seen that two control boxes with different functions exist. The control switch electrically communicates with the control box associated with the electric bed through a circuit board and then controls the motor movement of the electric bed.

In an embodiment, the wireless charging assembly 2 has multiple state switching modes and is not limited herein.

For example, the wireless charging assembly 2 may always be in a charging state whether the pressing portion 31 is separated from the control switch 32 or not.

For another example, the control switch 32 may be triggered (for example, pressed once and then released once) to send a control signal to instruct the wireless charging power to turn on/off. The preceding functions are selectable.

The embodiment of the present disclosure discloses a control box and electric furniture. With the present embodiment, the volume of the control box is reduced, and the aesthetic performance of the control box is improved.

The embodiment of the present disclosure discloses a control box. In the control box, the wireless charging assembly is pressed downward by an external force such that the wireless charging assembly moves downward relative to the control box body to drive or push the pressing portion toward the control switch. When the pressing portion abuts against the control switch, the control switch acts. After the external force is removed, the wireless charging module moves away from the control switch under the action of the elastic resetting portion so that the pressing portion is separated from the control switch. In the control box provided in the embodiment of the present disclosure, the wireless charging assembly, the pressing portion and the control switch are arranged in cooperation so that the compactness among structural members of the control box is improved, the integration degree of the control box is improved, the volume of the control box is reduced, and the appearance effect of the control box is improved.

The embodiment of the present disclosure also provides electric furniture including the preceding control box so that it is convenient for a user to control the electric furniture through the control box. Moreover, the control box has wireless charging function so that the user can wirelessly charge a mobile terminal such as a mobile phone by the control box. In the control box, the wireless charging assembly, the control switch, and the pressing portion are arranged in cooperation. In this manner, the compactness among structural members in the control box is improved, the volume of the control box is reduced, the appearance effect of the control box is improved, and the user has high satisfaction.

The preceding embodiments of the present disclosure are merely examples of the present disclosure, and are not intended to limit the embodiments of the present disclosure. For those of ordinary skill in the art, changes or alterations in other different forms may also be made based on the preceding description. All implementations cannot be and do not need to be exhausted herein. Any modifications, equivalent substitutions, and improvements made within the concept of the present disclosure fall within the scope of the claims of the present disclosure.

In the description of the present disclosure, orientations or position relations indicated by terms such as "center", "upper", "lower", "left", "right", "vertical", "horizontal", "in", and "out" are orientations or position relations based on the drawings. These orientations or position relations are intended only to facilitate the description of the present disclosure and simplify the description and not to indicate or imply that a device or element referred to must have such specific orientations or must be configured or operated in such specific orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions.

In the description of the embodiments of the present disclosure, it is to be noted that unless otherwise expressly specified and limited, the term "mounted", "connected to each other" or "connected" should be construed in a broad sense as securely connected, detachably connected or integrally connected; mechanically connected or electrically connected; directly connected to each other or indirectly connected to each other via an intermediary; or intraconnected between two components. For those of ordinary skill in the art, specific meanings of the preceding terms in the present disclosure may be construed according to specific circumstances.

What is claimed is:

1. A control box, comprising a control box body, a control board, and a control switch electrically connected to the control board and further comprising a wireless charging assembly electrically connected to the control board, wherein the wireless charging assembly and the control box body are connected to each other to form an accommodation space for accommodating the control board, wherein the accommodation space contains:

a control switch electrically connected to the control board and configured to control an operation of an electric component;

a pressing portion, wherein the wireless charging assembly is liftable relative to the control box body and is configured to drive the pressing portion to act to abut against the control switch; and an elastic resetting portion configured to provide a force to raise the wireless charging assembly such that the pressing section is separated from the control switch;

wherein the elastic resetting portion comprises a plurality of elastic arms capable of elastically deforming and a support plate disposed directly below the wireless charging assembly and abutting against the wireless charging assembly, wherein the support plate is connected to the control box body by the plurality of elastic arms distributed in a peripheral direction.

2. The control box according to claim 1, wherein an upper end of the pressing portion is connected to the wireless charging assembly, and a lower end of the pressing portion passes through the support plate and faces the control switch; or an upper end of the pressing portion is connected to a lower surface of the support plate, and a lower end of the pressing portion faces the control switch.

3. The control box according to claim 2, further comprising a wireless charging indicator light electrically connected to the control board, wherein the wireless charging indicator light is configured to indicate whether the wireless charging assembly is in a working state.

4. The control box according to claim 3, wherein the wireless charging assembly is engaged with the control box body.

5. The control box according to claim 4, wherein the control box body comprises a mounting portion, the wireless charging assembly is provided with a plurality of anti-drop fasteners distributed in a peripheral direction, the mounting portion is provided with a plurality of fastener holes in one-to-one correspondence with the plurality of anti-drop fasteners, and a lower end of each of the plurality of anti-drop fasteners is configured to pass through a corresponding fastener hole and abut against a lower surface of the mounting portion or be separated from a lower surface of the mounting portion.

6. The control box according to claim 5, further comprising a microphone and a voice indicator light that are each electrically connected to the control board, wherein the voice indicator light is configured to indicate a working state of the microphone.

7. The control box according to claim 6, further comprising a loudspeaker electrically connected to the control board.

8. The control box according to claim 6, further comprising a wireless charging indicator light electrically connected to the control board, wherein the wireless charging indicator light is configured to indicate whether the wireless charging assembly is in a working state.

9. The control box according to claim 5, wherein the mounting portion is provided with a wire slot, the wireless charging assembly is connected to a wire, and the wire passes through the wire slot and is connected to the control board.

10. The control box according to claim 5, wherein the control box body further comprises an upper cover and a lower cover engaged with the upper cover; and the mounting portion is engaged with the upper cover, and/or the mounting portion and the lower cover are connected by a fastening piece.

11. The control box according to claim 5, further comprising a wireless charging indicator light electrically connected to the control board, wherein the wireless charging indicator light is configured to indicate whether the wireless charging assembly is in a working state.

12. The control box according to claim 4, further comprising a wireless charging indicator light electrically connected to the control board, wherein the wireless charging indicator light is configured to indicate whether the wireless charging assembly is in a working state.

13. The control box according to claim 1, further comprising a wireless charging indicator light electrically connected to the control board, wherein the wireless charging indicator light is configured to indicate whether the wireless charging assembly is in a working state.

14. The control box according to claim 1, wherein a lower surface of the control box body is provided with an anti-slip pad.

15. The control box according to claim 1, further comprising a charging assembly (6) electrically connected to the control board, wherein the charging assembly (6) is pluggably connected to a structure to be charged.

16. The control box according to claim 1, wherein the wireless charging assembly is engaged with the control box body.

17. The control box according to claim 1, further comprising a microphone and a voice indicator light that are each electrically connected to the control board, wherein the voice indicator light is configured to indicate a working state of the microphone.

18. The control box according to claim 1, further comprising a loudspeaker electrically connected to the control board.

19. Electric furniture, comprising the control box according to claim 1.

* * * * *